United States Patent
Kritt et al.

(10) Patent No.: US 9,372,598 B2
(45) Date of Patent: Jun. 21, 2016

(54) REFERENCE-BASED CIRCULAR SCROLLING MENU

(71) Applicant: LENOVO ENTERPRISE SOLUTIONS (SINGAPORE) PTE LTD., New Tech Park (SG)

(72) Inventors: Barry A. Kritt, Raleigh, NC (US); Sarbajit K. Rakshit, Kolkata (IN)

(73) Assignee: Lenovo Enterprise Solutions (Singapore) PTE. LTD., NewTech Park (SG)

( * ) Notice: Subject to any disclaimer, the term of this patent is extended or adjusted under 35 U.S.C. 154(b) by 172 days.

(21) Appl. No.: 14/154,754

(22) Filed: Jan. 14, 2014

(65) Prior Publication Data

US 2015/0199087 A1 Jul. 16, 2015

(51) Int. Cl.
- *G06F 13/00* (2006.01)
- *G06F 15/00* (2006.01)
- *G06F 3/0482* (2013.01)
- *G06F 3/0485* (2013.01)
- *G06F 3/0488* (2013.01)

(52) U.S. Cl.
CPC ............ *G06F 3/0482* (2013.01); *G06F 3/0485* (2013.01); *G06F 3/04886* (2013.01); *G06F 2203/04806* (2013.01)

(58) Field of Classification Search
CPC ............................ G06F 3/04817; G06F 3/0219
USPC ...................... 715/810, 863, 851, 853, 10, 38
See application file for complete search history.

(56) References Cited

U.S. PATENT DOCUMENTS

| | | | |
|---|---|---|---|
| 2008/0222575 A1* | 9/2008 | Hollemans | G06F 3/0338 715/863 |
| 2012/0192231 A1* | 7/2012 | Maa | G06F 3/0219 725/38 |
| 2013/0031507 A1 | 1/2013 | George | |
| 2013/0185642 A1 | 7/2013 | Gammons | |
| 2013/0203492 A1* | 8/2013 | Yum | A63F 13/06 463/31 |
| 2014/0298261 A1* | 10/2014 | Imoto | G06F 3/04817 715/810 |

OTHER PUBLICATIONS

Monoda, "HOWTO: enable circular scrolling on synaptics touchpads," Debian User Forums, downloaded from <http://forums.debian.net/viewtopic.php?t=26480> on Jan. 14, 2014, Feb. 5, 2008.

* cited by examiner

*Primary Examiner* — Kevin Nguyen
(74) *Attorney, Agent, or Firm* — Katherine Brown

(57) ABSTRACT

Provided are techniques for reference-based circular scrolling on a computer display. Techniques include generating a circular scrolling bar in a computer display, the scrolling bar comprising a plurality of segments; populating the circular scrolling bar with reference-based information corresponding to an information source, wherein each segment of the plurality of segments displays a unique reference corresponding to a corresponding discrete portion of the information source; presenting the corresponding discrete portion of the information source corresponding to a particular segment in response to contact with the particular segment.

20 Claims, 5 Drawing Sheets

REFERENCE-BASED CIRCULAR SCROLLING MENU

FIELD OF DISCLOSURE

The claimed subject matter relates generally to computer graphics and, more specifically, to a techniques for reference-based circular scrolling on a computer display.

BACKGROUND OF THE INVENTION

Many computing devices, including, but not limited to, desktop computers, mobile telephones, pad computers and notebook computers provide a graphical user interface (GUI) to facilitate interaction with the computing device. In addition, many of these devices provide touch screens, which enable a user to manipulate data by placing a finger or pointing device on a display to either point or make a movement. For example, touch screens typically enable a user to scroll through a list by touching the display and flicking the finger is the desired scroll direction. Typically, scrolling occurs in a linear fashion, i.e, either up/down or right/left. Although some devices provide circular scrolling, such scrolling operates in a fashion similar to standard scrolling in that a user may only reference that which is displayed with in the scroll.

SUMMARY

Provided are techniques for reference-based circular scrolling on a computer display. Techniques include generating a circular scrolling bar in a computer display, the scrolling bar comprising a plurality of segments; populating the circular scrolling bar with reference-based information corresponding to an information source, wherein each segment of the plurality of segments displays a unique reference corresponding to a corresponding discrete portion of the information source; presenting the corresponding discrete portion of the information source corresponding to a particular segment in response to contact with the particular segment.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
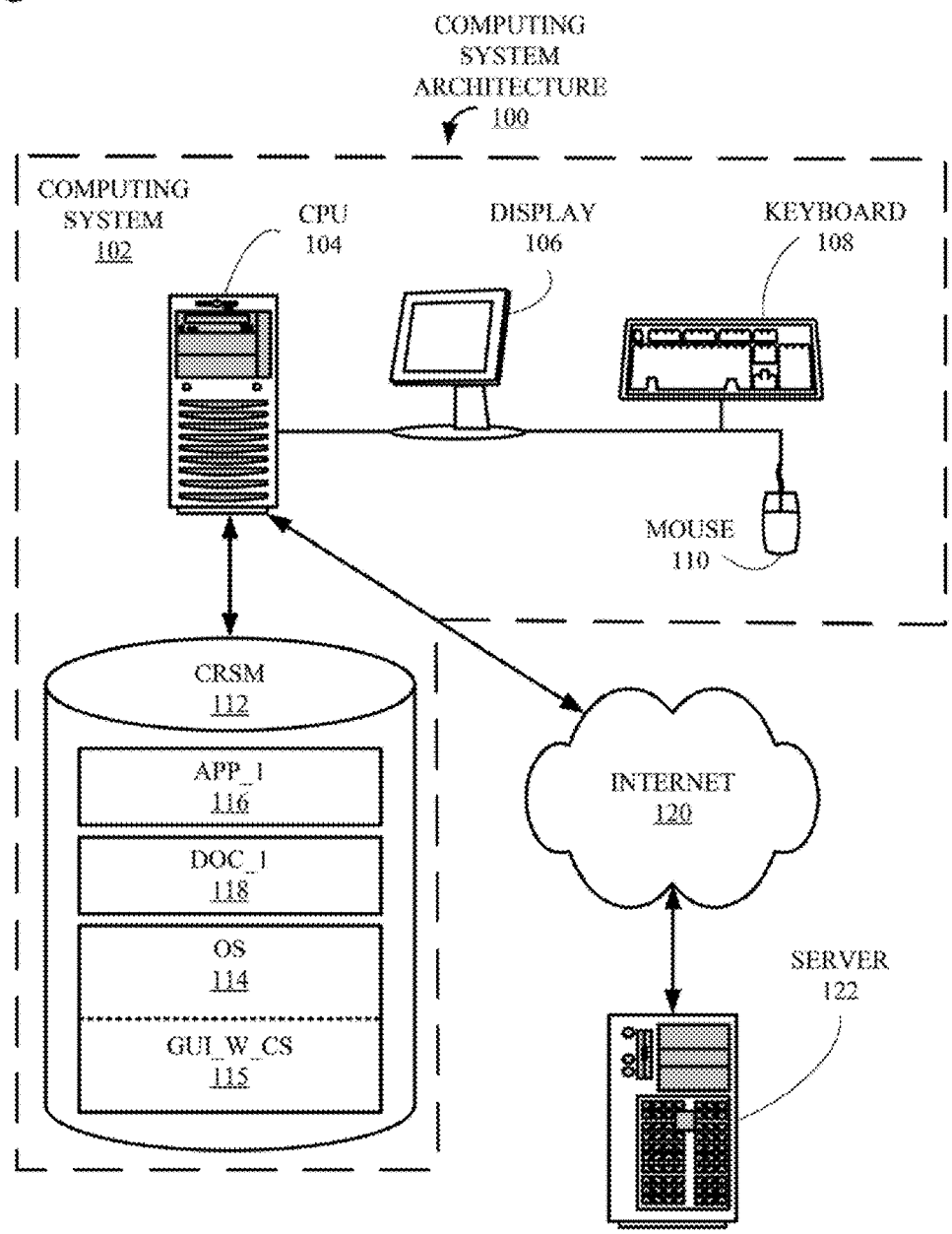
FIG. 1 is a computing system that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a computing system that may implement the claimed subject matter. Turning now to the figures, FIG. 1 is a block diagram of an exemplary computing system architecture 100 that incorporates the claimed subject matter. A computing system 102 includes a central processing unit (CPU) 104, coupled to a display 106, a keyboard 108 and a pointing device, or "mouse," 110, which together facilitate human interaction with computing system 100 and client system 102. In the following examples, display 104 is a touch-screen device although it should be under stood that the disclosed technology is also applicable to non-touch screen devices. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown).

CRSM 112 is illustrated storing an operating system (OS) 114 and a software application, i.e., an app_1 116, and a document, i.e., a doc_1 118, which are used as examples throughout the Specification of applications and files that make take advantage of the claimed subject matter. In the example, GUI 114 incorporates a graphical user interface with circular scroll (GUI_W_CS) 115 that incorporates the claimed subject matter. It should be understood that that although illustrated as part of OS 114, GUI_W_CS 115 may also be implemented in conjunction with an application such as application 116, as a plug-in module, or, as one with skill in the relevant arts will realize, in other types of configurations. GUI_W_CS_ 115 is described in more detail below in conjunction with FIGS. 2-4.

Computing system 102 and CPU 104 are connected to the Internet 120, which is also connected to a server computer, or simply "server," 122. Although in this example, computing system 102 and server 122 are communicatively coupled via the Internet 120, they could also be coupled through any number of communication mediums such as, but not limited to, a local area network (LAN) (not shown). Further, it should be noted there are many possible computing system configurations, of which computing architecture 100 is only one simple example.

Figure 2:
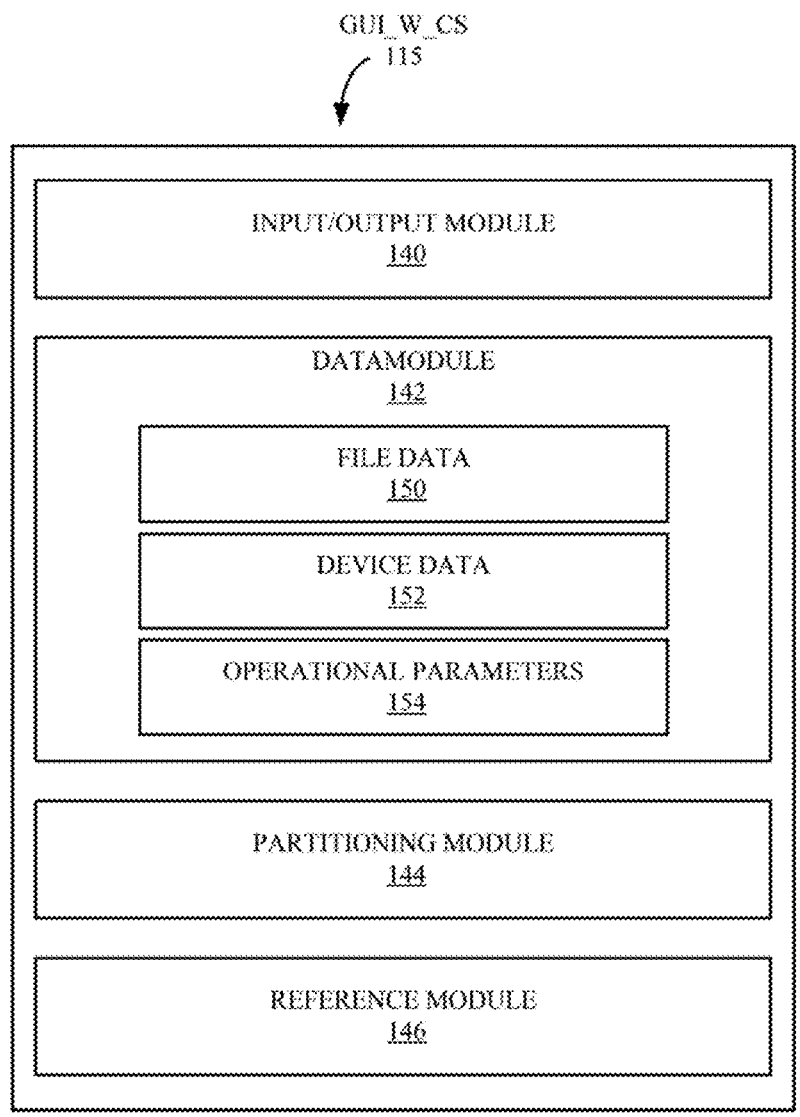
FIG. 2 is a block diagram of a graphical user interface with circular scroll (GUI_W_CS) 115, first shown in FIG. 1, in greater detail.

FIG. 2 is a block diagram of GUI_W_CS 115, introduced above in FIG. 1, in greater detail. GUI_W_CS 115 includes an input/output (I/O) module 140, a data module 142, a partitioning module 144 and a correlation module 148. For the sake of the following examples, GUI_W_CS 115 is assumed to be stored on CESM 112 (FIG. 1) as part of OS 114 (FIG. 1) and execute on one or more processors (not shown) of computer 102 (FIG. 1). It should be understood that the claimed subject matter can be implemented in many types of applications, operating systems, computing systems and data storage structures but, for the sake of simplicity, is described only in terms of computing system 102, architecture 100 (FIG. 1) and application 116. Further, the representation of GUI_W_CS 115 in FIG. 2 is a logical model. In other words, components 140, 142, 144 and 146 may be stored in the same or separates files and loaded and/or executed within system 102 either as a single system or as separate processes interacting via any available inter process communication (IPC) techniques. In addition, as a standalone application or plugin, GUI_W_CS 115 may be loaded or served from a remote computing device such as server 122 (FIG. 1).

I/O module 140 handles any communication GUI_W_CS 115 has with other components of system 102, including display 104. Data module 142 is a data repository for information that GUI_W_CS 115 requires during normal operation. Examples of the types of information stored in data module 142 include file data 150, device data 152 and operating parameters 156. File data 150 stores information relevant to files such as doc_1 118 (FIG. 1). Information corresponding on any particular file may include reference-based data such as, but not limited to, book marks and notes. Device data 152 stores information on devices compatible with the disclosed technology. Operation parameters 154 sores information that control the operation, including the look and feel, of GUI_W_CS 115.

Partitioning module 144 transforms files such as doc_1 118 into discrete partitions in accordance with the claimed subject matter. For example, if doc_1 has one hundred (100) pages, GUI_W_CS 115 may organize partitions of a scroll wheel (see 170, FIG. 3) to provide access to pages 1-10 or to pares, 1-10, 11-20, 21-30 and so so. Reference module 146 enables a user to enter and store information corresponding to lines and partitions of doc_1 118 into file data 150. Components 140, 142, 144, 146, 150, 152 and 154 are described in more detail below in conjunction with FIGS. 3-4.

Figure 3:
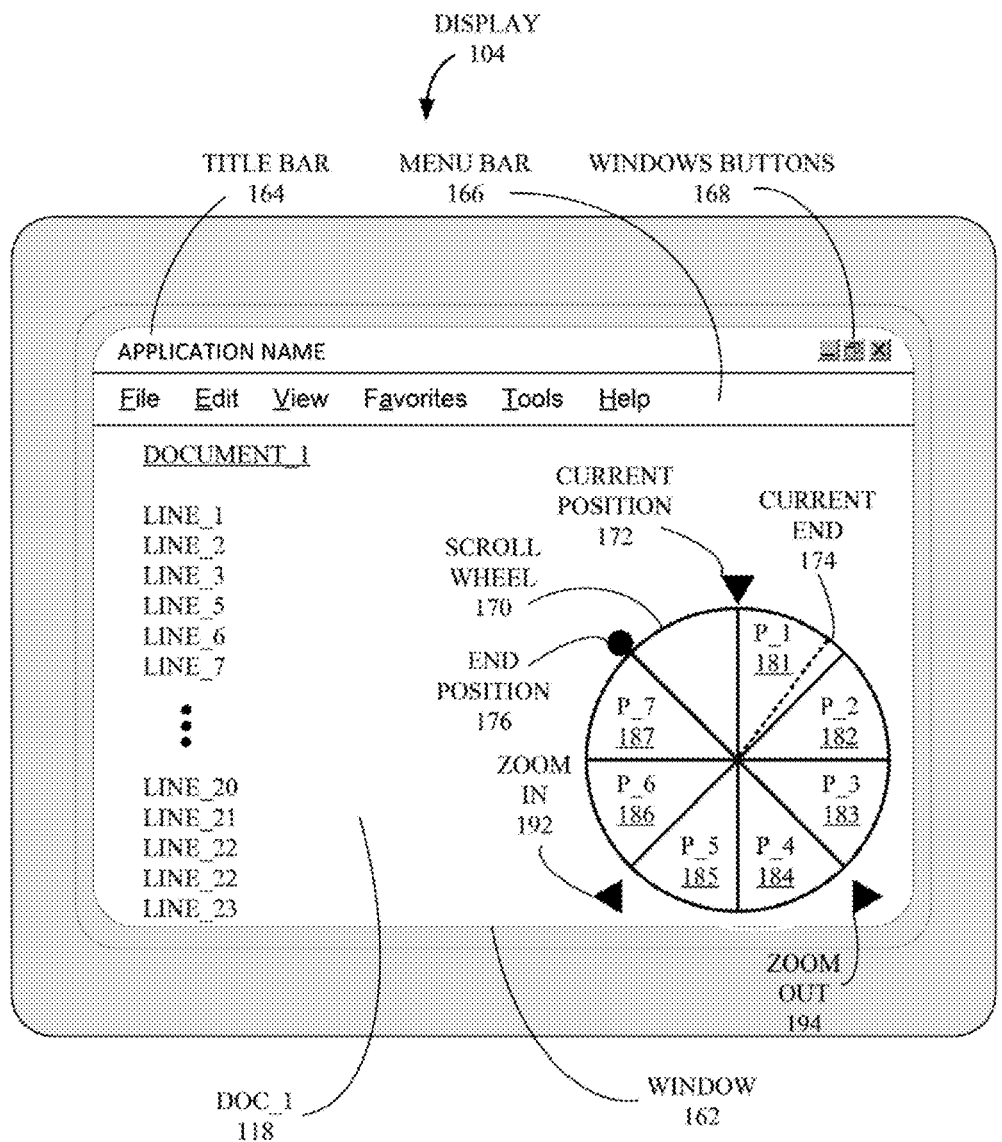
FIG. 3 is an illustration of GUI_W_CS of FIGS. 1 and 2 displaying a scroll wheel on a computer display in accordance with the claimed subject matter.

FIG. 3 is an illustration of display 104 (FIG. 1) with example of a window 162 that employs the claimed subject matter. In this example, window 162 is displaying lines 1-23 of doc_1 118 (FIG. 1). Window 162 includes a title bar 164, which lists the name of a displayed program, or "Application Name," which corresponds to app_1 116 (FIG. 1). As is typical in many graphical user interfaces (GUIs), title bar 164 may include several window buttons 168, or a "Minimize" button, a "Restore" button and an "Exit" button. Below title bar 164 is a menu bar 166, which may include a "File" option, "Edit" option, "View" option, "Favorites" option, "Tools" option and "Help" option. The standard look and feel of GUI applications should be familiar to those with skill in the art.

Window 162 also includes a scroll wheel 170, which illustrates aspects of the claimed subject matter. Although for the sake of clarity scroll wheel 170 is illustrated with solid dark lines, scroll wheel 170 and the various elements described below would typically be displayed semi-transparently so that portions of window 162 displayed behind and obscured by scroll wheel 170 would still be visible. Scroll wheel 170 includes a current position marker, or simply "current position," 172, which indicates the position of doc_1 118 in window 162. A current end 174 indicates the end of the portion of doc_1 that is currently visible in window 162 and an end position 176 indicates the end of doc_1 118 with respect to this particular partitioning.

In this example, scroll wheel 170 is divided into eight (8) sections although the specific number is configurable, as is the size and transparency of scroll wheel 170. Each of seven (7) of the sections of scroll wheel 170 display a reference to one of the seven (7) pages in doc_1 118, i.e., "Page 1" or "P_1" 181, "Page 2" or "P_2" 182, "Page 3" or "P_3" 183, "Page 4" or "P_4" 184, "Page 5" or "P_5" 185, "Page 6" or "P_6" 186 and "Page 7" of "P_7" 187. An eighth section is blank because, in this example doc_1 only has seven (7) pages. A zoom in button 196 and a zoom out button 198 provide a user with the means to repartition doc_1 118 either to a finer level or a coarser level, respectively, and to display references to the partitions in the sections of scroll wheel 170. In this example zoom in 196 would typically be inoperative, or grayed out, to indicate that there are no finer levels that may be provided. In the alternative, rather than simply being inoperative at this level, Zoom In 196 may convert scroll wheel to a heading/sub-heading configuration (see FIG. 4). If a user were to either touch zoom out 198 on a touch screen or position mouse 110 (FIG. 1) over button 198 and "click," GUI_W_CS 115 (FIGS. 1 and 2) repartitions doc_1 118 into courser sections for display. For example, If there are one hundred (100) lines in doc_1 118, a courser partitioning may be into sections 1-10, 11-20, 21-30 and so on up to 91-100. In such a case, assuming doc_1 118 is still positioned at the beginning, scroll wheel 170 would display "Pages 1-10," "Pages 11-20" and so on up to "Pages 71-80" in the respective sections. A user may change scroll wheel 170 to display higher ranges of pages by touching a section and moving a finger in a counter clockwise direction. In a similar fashion, lower ranges, if available, may be displayed by rotating the finger in a clockwise direction. In the alternative, a user may position a mouse over a section, hold a mouse button (not shown) down and move the mouse in a counter clockwise or clockwise direction to achieve the same affect. In this manner, the user is able to scroll through doc_1 118 at a user selected level of granularity. Additional functionality associated with scroll wheel 170 is described below in conjunction with FIG. 4.

Figure 4:
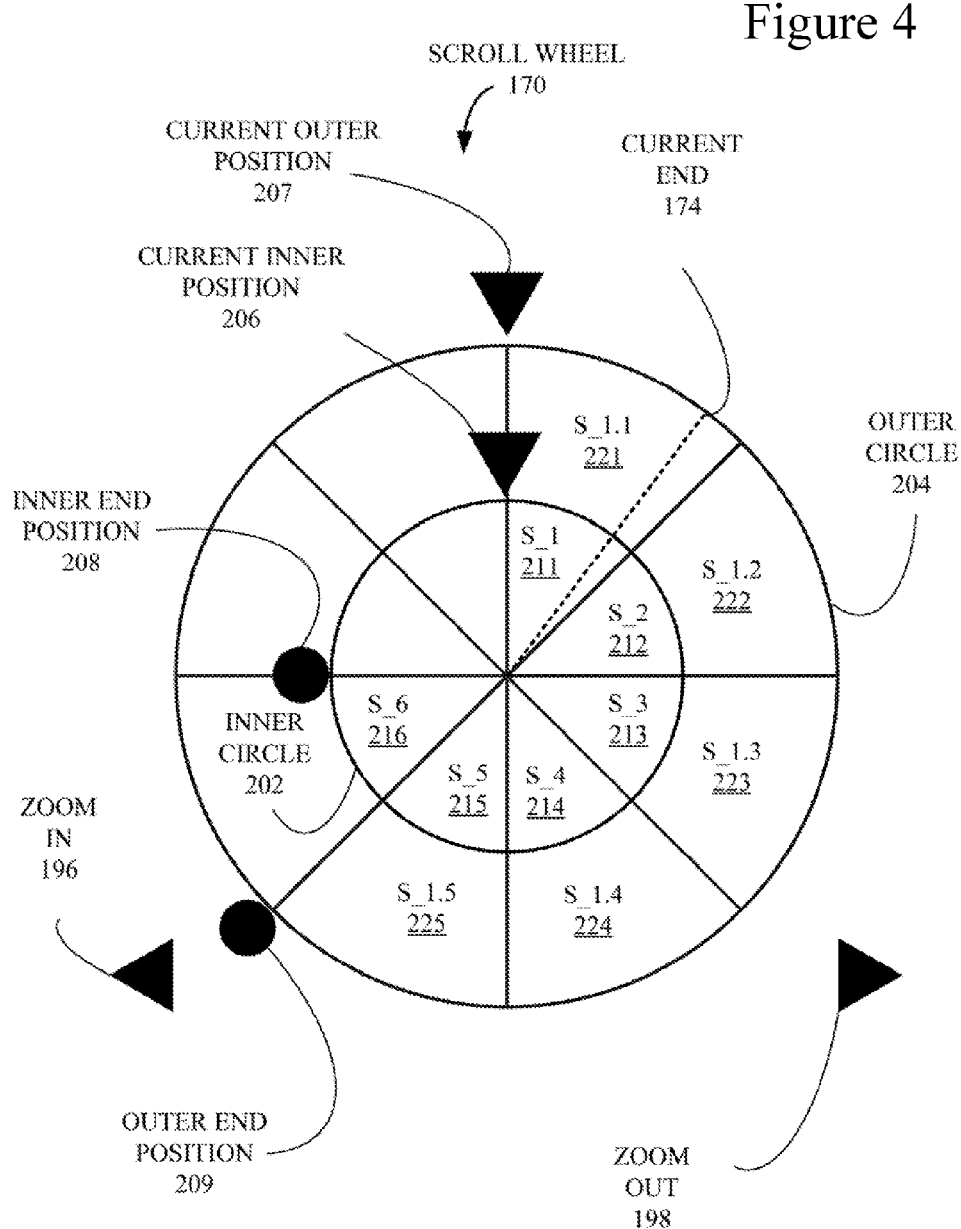
FIG. 4 is an illustration of the scroll wheel of FIG. 3 in a subject-based display configuration.

FIG. 4 is an illustration of scroll wheel 170 (FIG. 3) in a subject-based display configuration. Like the configuration in FIG. 3, scroll wheel 170 still includes current end 174 (FIG. 3), zoom in 196 (FIG. 3) and zoom out 198 (FIG. 1). Unlike the configuration of FIG. 3, in this example scroll, wheel 170 includes an inner circle 202 and an outer circle 204. Each of inner circle 202 and outer circle 204 have its own current position indicator, i.e. a current inner position 206 and a current outer position 207, respectively, and its own end position indicator, i.e., an inner end position 208 and an outer end position 209, respectively.

Inner circle 202 is sectioned into eight (8) sections, which are displaying six (6) subject headers, i.e., a S_1 211, a S_2 212, a S_3 213, a S_4 214, a S_5 215 and a S_6 216. Because current inner position 206 is pointed at S_1 211, outer circle 204 is displaying five (5) sub-headings for S_1 211, i.e., a S_1.1 221, a S_1.2 222, a S_1.3 223, a S_1.4 224 and a S_1.5 225. As a user rotates inner circle 202, the sub-headings displayed in outer circle 204 change to reflect the heading 211-216 pointed to by current inner position 206. It should be noted that inner circle 202 and outer circle 204 may be rotated independently to enable a user to quickly scroll through a document and display a desired portion. IN addition, Zoom In 196 and Zoom Out 198 enable a user to go from a heading/sub-heading configuration to a sub-heading/sub-sub-heading configuration and vice versa.

Figure 5:
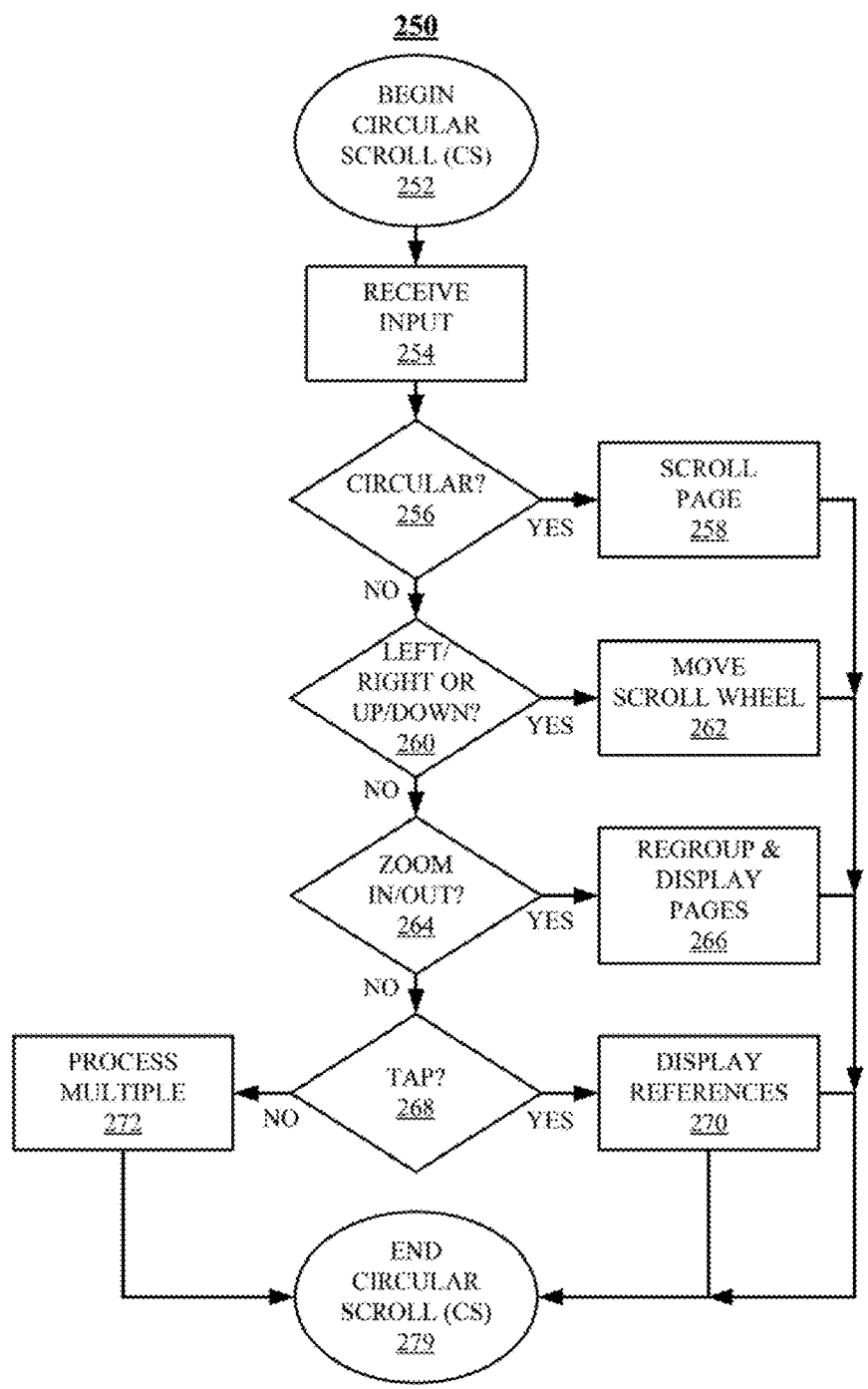
FIG. 5 is a flowchart of one example of a "Display Circular Scroll" process that may implement aspects of the claimed subject matter.

FIG. 5 is a flowchart of one example of a "Display Circular Scroll" process 250 that may implement aspects of the claimed subject matter. In this example, process 250 is associated with logic stored on CRSM 112 (FIG. 1) in conjunction with OS 114 (FIG. 1) and GUI_W_CS 115 (FIG. 1) and executed on one or more processors (not shown) of CPU 104 (FIG. 1) of computing system 102 (FIG. 1). Process 250 describes how scroll wheel 170 (FIG. 3) processes user input, either provided via mouse 110 (FIG. 1) or via a finger or stylus (not shown) in contact with a touch screen such as display 104 (FIGS. 1 and 3).

Process 250 starts in a "Begin Circular Scroll (CS)" block 252 and proceeds immediately to a "Receive Input" block 254. As explained above, in the following example, user input is provided by a user of computing system 102 either via mouse 110 (FIG. 1) or a finger or stylus in contact with display 104. Once user input has been detected, control proceeds to a "Circular?" block 256. During processing associated with block 256, a determination is made as to whether or not the user input is a circular motion around scroll wheel 170, either in a clockwise or counter-clockwise direction. If so, control proceeds to a "Scroll Page" block 258.

During processing associated with block 258, scroll wheel 172 is rotated in the corresponding direction and the displayed page is scrolled, either towards a higher numbered page in the event of a counter-clockwise movement or a lower numbered page in the event of a clockwise movement. For example, if current position 172 (FIG. 3) is positioned as in FIG. 3 at the beginning of P_1 181 (FIG. 3), indicating that a first page of doc_1 118 (FIGS. 1 and 3) is displayed in window 162 (FIG. 3), and a user places a finger in P_1 181 and rotates scroll wheel 170 is a counter-clockwise direction, the page displayed in window 162 will be the one on which current position 172 points to when the rotation is concluded. In addition, as each of sections 181-187 are rotated around scroll wheel 170, addition page references are displayed as space becomes available. For example, if P_3 183 is rotated under current position 172, a page three (3) (not shown) of doc_1 118 would be displayed in window 162 and addition room for references to a pages eight (8) and nine (9), if available doc_1 118 were to have that many pages, are displayed in the positions previously occupied by P_6 186 and P_7 187, respectively. The page reference P_1 181 would not be displayed and the page reference P_2 182 would either not be displayed or displayed to the left of current position 172, depending upon the selected configuration.

If, during processing associated with block 256, a determination is made that the user input is not a circular motion, control proceeds to a "Left/Right or Up/Down?" block 210. During processing associated with block 260, a determination is made as to whether or not the user input received during processing associated with block 254 is a left/right or up/down motion. If so, control proceeds to a "Move Scroll Wheel" block 262. During processing associated with block 262, scroll wheel 170 is repositioned in window 162 accordingly. In this manner, a user can place scroll wheel 170 in any desired position within window 162 or move scroll wheel 170 to another window in a multi-window or multi display configuration (not shown). If a determination is made during processing associated with block 260 that the user input is not a left/right or up/down motion, control proceeds to a "Zoom In/Zoom Out?" block 264. During processing associated with block 264, a determination is made as to whether or not the user input received during processing associated with block 254, is a tap on either Zoom in 196 (FIG. 3) or Zoom Out 198 (FIG. 3). If so, control proceeds to a "Regroup and Display Pages" block 266. During processing associated with block 266, a corresponding adjustment is made to the grouping and display of the sections of scroll wheel 170 (see 144, FIG. 2). For example, if Zoom Out 198 is selected, rather than references 181-187 to pages 1-7, the section currently displaying P_1 181 may display a P_1-10 reference (not shown) to indicate that the section represents the first ten (10) pages of doc_1 118. In a similar fashion, the section currently displaying P_2 182 may display a P_11-20 reference (not shown), the section currently displaying P_3 183 may display a P_21-30 reference (not shown) and so on. If scroll wheel 170 is displaying references P_1-10, P_11-20 and so on, then the selection of Zoom In 196 would redisplay references 181-187.

If, during processing associated with block 264, a determination is made that the user input is not Zoom In 196 or Zoom Out 198, control proceeds to a "Tap?" block 268. During processing associated with block 268, a determination is made as to whether or not the user input received during processing associated with block 254 is a tap on one of the sections of scroll wheel 170. If so, control proceeds to a "Display References" block 270. During processing associated with block 270, any references associated with the reference 181-187 that has been "tapped" are displayed (see 146 and 150. FIG. 2).

If, during processing associated with block 268, a determination is made that the user input is not a tap, control proceeds to a "Process Multiple" block 272. During processing associated with block 272, the only remaining user action in this example, i.e., a multiple finger or stylus movement is processed. In this example, a pinching or spreading of the fingers causes scroll wheel 170 to be smaller or larger, respectively. It should be understood that the claimed subject matter is easily configurable to incorporate a wide variety of user inputs in addition to those described. Further, the specific action associated with any particular user input is configurable. For the sake of convenience only a few user inputs and actions are described but that should not in any manner be considered to limit the applicability of the claimed subject matter. Finally, after processing associated with blocks 258, 262, 266, 270 have 272 has concluded, control proceeds to an "End Circular Scroll" block 279 in which process 250 is complete.

The terminology used herein is for the purpose of describing particular embodiments only and is not intended to be limiting of the invention. As used herein, the singular forms "a". "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
    generating a circular scrolling wheel on a display of a computing device, wherein the scrolling wheel comprises a plurality of segments and a current position indicator;
    grouping an information source into a first plurality of discrete portions;
    displaying in each segment of the plurality of segments, a first corresponding reference of a plurality of references, each first corresponding reference identifying a unique portion of the first plurality of discrete portions; and
    displaying a first unique portion of the information source corresponding to a particular reference displayed in a first segment positioned at the current position indicator.

2. The method of claim 1, further comprising:
    detecting, with respect to the scrolling wheel, a user input representing a circular motion, wherein the circular motion represents a clockwise or counter-clockwise rotation of the scrolling wheel;
    shifting display of the first corresponding references from segment to segment in a clockwise or counter-clockwise direction in proportion to the clockwise or counter-clockwise rotation, respectively, of the scrolling wheel;
    displaying a second unique portion of the information source corresponding to a particular reference displayed in a second segment positioned at the current position indicator following the shifting.

3. The method of claim 1, further comprising:
    detecting, with respect to the scrolling wheel, a user input representing a zoom; and
    regrouping the information source into a second plurality of discrete portions; and
    displaying in each segment of the plurality of segments, a second corresponding reference of a second plurality of references, each second corresponding reference identifying a unique portion of the second plurality of discrete portions.

4. The method of claim 1, further comprising:
   detecting, with respect to the scrolling wheel, a user input representing a tap on a particular segment; and
   displaying reference data corresponding to the corresponding unique portion associated with the first corresponding reference displayed in the particular segment.

5. The method of claim 4, wherein the reference data is from a list of types of reference data, the list consisting of:
   a bookmark; and
   a comment.

6. The method of claim 1, further comprising:
   detecting, with respect to the scrolling wheel, a user input representing one of a horizontal movement or a vertical movement;
   moving the scrolling wheel horizontally on the display of the computing device in response to the detecting of the horizontal movement; and
   moving the scrolling wheel vertically on the display of the computing device in response to the detecting of the vertical movement.

7. The method of claim 1, further comprising:
   detecting, with respect to the scrolling wheel, a user input representing two contacts on the display, wherein the two contacts are either moving closer to each other or moving farther from each other;
   resizing the scrolling wheel so that the scrolling wheel is smaller with respect to the display in response to the detecting of the two contacts moving closer to each other; and
   resizing the scrolling wheel so that the scrolling wheel is larger with respect to the display in response to the detecting of the two contacts moving farther from each other.

8. An apparatus, comprising:
   a plurality of processors;
   a non-transitory, computer-readable storage medium coupled to the plurality of processors;
   a display; and
   logic, stored on the computer-readable storage medium and executed on the plurality of processors, for:
      generating a circular scrolling wheel on the display, wherein the scrolling wheel comprises a plurality of segments and a current position indicator;
      grouping an information source into a first plurality of discrete portions;
      displaying in each segment of the plurality of segments, a first corresponding reference of a plurality of references, each first corresponding reference identifying a unique portion of the first plurality of discrete portions; and
      displaying a first unique portion of the information source corresponding to a particular reference displayed in a first segment positioned at the current position indicator.

9. The apparatus of claim 8, the logic further comprising logic for:
   detecting, with respect to the scrolling wheel, a user input representing a circular motion, wherein the circular motion represents a clockwise or counter-clockwise rotation of the scrolling wheel;
   shifting display of the first corresponding references from segment to segment in a clockwise or counter-clockwise direction in proportion to the clockwise or counter-clockwise rotation, respectively, of the scrolling wheel;
   displaying a second unique portion of the information source corresponding to a particular reference displayed in a second segment positioned at the current position indicator following the shifting.

10. The apparatus of claim 8, the logic further comprising logic for:
    detecting, with respect to the scrolling wheel, a user input representing a zoom; and
    regrouping the information source into a second plurality of discrete portions; and
    displaying in each segment of the plurality of segments, a second corresponding reference of a second plurality of references, each second corresponding reference identifying a unique portion of the second plurality of discrete portions.

11. The apparatus of claim 8, the logic further comprising logic for:
    detecting, with respect to the scrolling wheel, a user input representing a tap on a particular segment; and
    displaying reference data corresponding to the corresponding unique portion associated with the first corresponding reference displayed in the particular segment.

12. The apparatus of claim 11, wherein the reference data is from a list of types of reference data, the list consisting of:
    a bookmark; and
    a comment.

13. The apparatus of claim 8, the logic further comprising logic for:
    detecting, with respect to the scrolling wheel, a user input representing one of a horizontal movement or a vertical movement;
    moving the scrolling wheel horizontally on the display of the computing device in response to the detecting of the horizontal movement; and
    moving the scrolling wheel vertically on the display of the computing device in response to the detecting of the vertical movement.

14. The apparatus of claim 8, the logic further comprising logic for:
    detecting, with respect to the scrolling wheel, a user input representing two contacts on the display, wherein the two contacts are either moving closer to each other or moving farther from each other;
    resizing the scrolling wheel so that the scrolling wheel is smaller with respect to the display in response to the detecting of the two contacts moving closer to each other; and
    resizing the scrolling wheel so that the scrolling wheel is larger with respect to the display in response to the detecting of the two contacts moving farther from each other.

15. A computer programming product, comprising:
    a non-transitory, computer-readable storage medium; and
    logic, stored on the computer-readable storage medium for execution on a plurality of processors, for:
       generating a circular scrolling wheel on a display of a computing device, wherein the scrolling wheel comprises a plurality of segments and a current position indicator;
       grouping an information source into a first plurality of discrete portions;
       displaying in each segment of the plurality of segments, a first corresponding reference of a plurality of references, each first corresponding reference identifying a unique portion of the first plurality of discrete portions; and displaying a first unique portion of the information source corresponding to a particular reference displayed in a first segment positioned at the current position indicator.

16. The computer programming product of claim 15, the logic further comprising logic for:
   detecting, with respect to the scrolling wheel, a user input representing a circular motion, wherein the circular motion represents a clockwise or counter-clockwise rotation of the scrolling wheel;
   shifting display of the first corresponding references from segment to segment in a clockwise or counter-clockwise direction in proportion to the clockwise or counter-clockwise rotation, respectively, of the scrolling wheel;
   displaying a second unique portion of the information source corresponding to a particular reference displayed in a second segment positioned at the current position indicator following the shifting.

17. The computer programming product of claim 15, the logic further comprising logic for:
   detecting, with respect to the scrolling wheel, a user input representing a zoom; and
   regrouping the information source into a second plurality of discrete portions; and
   displaying in each segment of the plurality of segments, a second corresponding reference of a second plurality of references, each second corresponding reference identifying a unique portion of the second plurality of discrete portions.

18. The computer programming product of claim 15, the logic further comprising logic for:
   detecting, with respect to the scrolling wheel, a user input representing a tap on a particular segment; and
   displaying reference data corresponding to the corresponding unique portion associated with the first corresponding reference displayed in the particular segment.

19. The computer programming product of claim 15, the logic further comprising logic for:
   detecting, with respect to the scrolling wheel, a user input representing one of a horizontal movement or a vertical movement;
   moving the scrolling wheel horizontally on the display of the computing device in response to the detecting of the horizontal movement; and
   moving the scrolling wheel vertically on the display of the computing device in response to the detecting of the vertical movement.

20. The computer programming product of claim 15, the logic further comprising logic for:
   detecting, with respect to the scrolling wheel, a user input representing two contacts on the display, wherein the two contacts are either moving closer to each other or moving farther from each other;
   resizing the scrolling wheel so that the scrolling wheel is smaller with respect to the display in response to the detecting of the two contacts moving closer to each other; and
   resizing the scrolling wheel so that the scrolling wheel is larger with respect to the display in response to the detecting of the two contacts moving farther from each other.

* * * * *